(12) United States Patent
Grainger

(10) Patent No.: US 7,140,502 B2
(45) Date of Patent: Nov. 28, 2006

(54) SUPPORT SYSTEM FOR A MOVING SHELF

(76) Inventor: Allan Grainger, Oakdale, Penydarren Park, Merthyr Tydfil (GB) CF47 8YW ( * ) Notice: Subject to any disclaimer, the term of this patent is extended or adjusted under 35 U.S.C. 154(b) by 457 days.

(21) Appl. No.: 10/485,317

(22) PCT Filed: Jul. 29, 2002

(86) PCT No.: PCT/GB02/03484

§ 371 (c)(1),
(2), (4) Date: Jan. 26, 2004

(87) PCT Pub. No.: WO03/011074

PCT Pub. Date: Feb. 13, 2003

(65) Prior Publication Data

US 2004/0232097 A1    Nov. 25, 2004

(30) Foreign Application Priority Data

Jul. 28, 2001  (GB) ................. 0118435.7

(51) Int. Cl.
*A47F 5/08* (2006.01)
(52) U.S. Cl. .................................... 211/151
(58) Field of Classification Search .......... 211/151, 211/162, 59.2; 414/276, 286
See application file for complete search history.

(56) References Cited

U.S. PATENT DOCUMENTS

| | | | |
|---|---|---|---|
| 3,708,074 A * | 1/1973 | Fahey et al. ................. | 211/151 |
| 4,482,066 A | 11/1984 | Dykstra | |
| 6,612,798 B1 * | 9/2003 | de Jong ....................... | 414/276 |
| 6,827,540 B1 * | 12/2004 | Walker et al. ............... | 414/281 |
| 6,851,562 B1 * | 2/2005 | Gorniak et al. ............. | 211/59.2 |

FOREIGN PATENT DOCUMENTS

| | | |
|---|---|---|
| EP | 0 624 327 A | 11/1994 |
| EP | 0 812 786 A | 12/1997 |

* cited by examiner

Primary Examiner—Sarah Purol
(74) Attorney, Agent, or Firm—King & Schickli, PLLC

(57) ABSTRACT

A support system including opposed flanged rollers (6) for guiding a moving shelf. Coupling members (23) co-operate with the flanged rollers to present co-axial inwardly projecting stub shafts (22). A support (27) is provided for each coupling member. The ends of a layshaft (21) are telescopically engageable with the free ends of the stub shafts, and relative rotation between the stub shafts and the layshaft and between the coupling members and the rollers is prevented. The assembly of coupling members, supports and layshaft is reduced axially, by the telescopic engagement, to locate between the opposed rollers. The assembly is expanded axially for the coupling members to co-operate with the rollers in a manner to ensure co-rotation. The supports are mounted on an underlying base (1), rotationally to carry the coupling members so that load on the rollers is transferred to the supports.

13 Claims, 2 Drawing Sheets

SUPPORT SYSTEM FOR A MOVING SHELF

FIELD OF THE INVENTION

This invention relates to storage structures with moving shelves. These have an advantage over fixed shelves in that shelves can be moved out in front of the framework or container that supports them to give better access for loading and unloading.

BACKGROUND OF THE INVENTION

Such shelves are supported by rollers, and when they are small and light they can easily be pushed and pulled directly by hand. But once size and weight increases, this becomes progressively more difficult, and it is necessary to have some means of assistance. It is not always viable to have some sort of motor or power assistance, and so the solution is to have a manually operable arrangement with a mechanical advantage. One example is a crank handle turning a spindle connected by sprockets and a chain to one of the rollers supporting the shelf. If the roller is at ground level, the spindle will be above it at about waist height for the user.

If the shelf is narrow, having this drive at just one side might be sufficient. But with a wider shelf, which will be correspondingly heavier, applying the drive to one side only will tend to skew it, and it might then bind or at least not run smoothly. Therefore, to cure this, as well as to give extra assistance in view of the increased weight, it is desirable to duplicate the drive system on the other side of the shelf.

However, there is then a synchronising problem. The spindles cannot be directly coupled by a co-axial shaft; that would traverse the load space above the shelf. So it is expedient to couple the drive rollers below the shelf.

Another problem with heavy shelves is that there are tremendous loads on the rollers, particularly when the shelf is fully out and most of the load is concentrated on just one pair of rollers almost at a point of balance. Conventionally, these rollers are carried by stub shafts inside uprights of a framework, and those shafts can be distorted under load. A cure for this is to extend the shafts through the rollers and provide another bearing on the inside of each roller. But this is not readily compatible with coupling the rollers.

SUMMARY OF THE INVENTION

It is the aim of this invention to provide a solution to these problems, both coupling the rollers and giving them extra support.

According to a first aspect of the present invention there is provided a support system for a moving shelf, the system comprising:
a) opposed flanged rollers, co-axial and with their flanges outermost to support and guide a shelf between the flanges;
b) coupling members to co-operate with inner faces of the flanged rollers to present co-axial inwardly projecting stub shafts, the coupling members being adapted to co-operate with the rollers in a manner to ensure co-rotation;
c) a support for each said coupling member whose stub shaft is embraced by a bearing carried by the support, the supports being mounted on an underlying base rotationally to carry the coupling members so that in use load on the rollers is transferred via said co-operation to the supports;
d) a layshaft, each of whose ends is telescopically engageable with the free ends of the stub shafts, and
e) one or more components for preventing relative rotation between the stub shafts and the layshaft and between the coupling members and the rollers, wherein the assembly of coupling members, supports and layshaft is axially expandable by the telescopic engagement to provide said co-operation and the assembly is axially reducible by the telescopic engagement to release said co-operation.

Each said coupling member may be generally disc-shaped with a substantially central perpendicular stem, the stem forming the stub shaft. The disc of the coupling member may be connected to the associated roller by means of a bolt.

The disc of the coupling member may have a polygonal protrusion and can key into a complementary socket in an inner face of the roller.

The stub shaft may be screw-threaded over its free end portion beyond the portion within the bearing and can be screwed into the end of the layshaft.

The support system may further include a lock nut for tightening against an end of the layshaft. The system may further include a transverse drilling through the overlap of stub shaft and layshaft to receive a pin.

The stub shaft may have a non-rotational but axially movable relationship to the layshaft and a locking device operable to fix the stub shaft relative to the layshaft.

The supports may include plain brackets with bearings. The supports may be vertically adjustable, possibly by means of a jack.

According to a further aspect of the present invention there is provided a method of assembling a support system for a moving shelf, the system comprising:
a) opposed flanged rollers, co-axial and with their flanges outermost to support and guide a shelf between the flanges,
b) coupling members to co-operate with inner faces of the flanged rollers to present co-axial inwardly projecting stub shafts, the coupling members being adapted to co-operate with the rollers in a manner to ensure co-rotation;
c) a support for each said coupling member whose stub shaft is embraced by a bearing carried by the support, the supports being mounted on an underlying base rotationally to carry the coupling members so that in use load on the rollers is transferred via said co-operation to the supports; and
d) a layshaft, each of whose ends is telescopically engageable with the free ends of the stub shafts, the method including steps of:
1) axially reducing the assembly of coupling members, supports and layshaft by adjustment of the telescopic engagement to locate between the opposed rollers,
2) axially expanding the assembly for the coupling members to co-operate with the rollers in a manner to ensure co-rotation, and
3) applying means to prevent relative rotation between the stub shaft and the layshaft, if the relative rotation is not already prevented by virtue of the shapes of those shafts.

According a further aspect of the present invention there is provided a support system for a moving shelf comprising:
a) opposed flanged rollers, co-axial and with their flanges outermost to support and guide a shelf between the flanges,
b) coupling members to co-operate with the inner faces of the flanged rollers to present co-axial inwardly projecting stub shafts, c) a support for each coupling member whose stub shaft is embraced by a bearing carried by the support,
d) a layshaft each of whose ends is telescopically engageable with the free ends of the stub shafts, and
e) means for preventing relative rotation between the stub shafts and the layshaft and between the coupling members and the rollers, wherein
1) the assembly of coupling members, supports and layshaft is reduced axially, by the telescopic engagement, to locate between the opposed rollers,
2) the assembly is expanded axially for the coupling members to co-operate with the rollers in a manner to ensure co-rotation,
3) the supports are mounted on an underlying base, rotationally to carry the coupling members so that load on the rollers is transferred via said co-operation to the supports, and
4) the means for preventing relative rotation between the stub shaft and the layshaft is put in place, if not already there by virtue of the shapes of those shafts.

Conveniently, each coupling member will be generally mushroom-shaped, the stem forming its stub shaft. The head is preferably bolted to the associated roller. But there are alternatives: for example the head may be polygonal and key into a complementary socket in the inner face of the roller.

Preferably, the stub shaft will be screw-threaded over its free end portion beyond the portion within the bearing. It will then screw into the end of the layshaft, and there can be a lock nut to be tightened against the end of the layshaft. For added security, there may be a transverse drilling through the overlap of stub shaft and layshaft to receive a pin.

But again there are alternatives, and the stub shaft could have a non-rotational but axially movable relationship to the layshaft. If that arrangement is adopted, together with the keying engagement between rollers and coupling members, measures will be taken to ensure that, once extended and coupling the rollers, the assembly cannot retract again and disengage.

The supports may be plain brackets with bearings. But it may in some circumstances be advantageous to use jacks so that there is some adjustability.

BRIEF DESCRIPTION OF THE DRAWING

For a better understanding of the invention, one embodiment will now be described, by way of example, with reference to the accompanying drawing, in which.

DETAILED DESCRIPTION OF THE INVENTION

Figure 1:
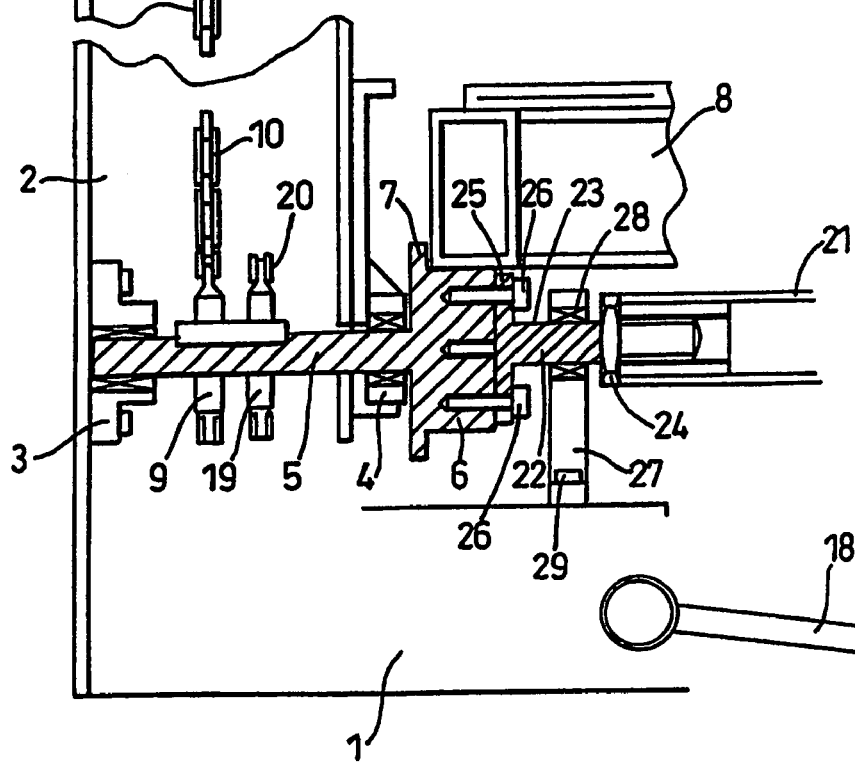
FIG. 1 is a cross-section of part of an embodiment of the storage structure with a moving shelf.
Figure 2:
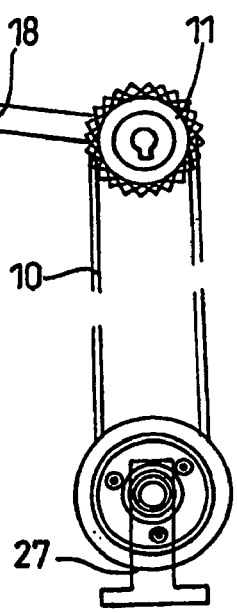
FIG. 2 is a diagram of a drive arrangement for the moving shelf.

The complete structure will be a three-dimensional framework, but shown in FIG. 1 is just a base 1 and an upright 2. Immediately above the base the upright is fitted with bearings 3 and 4 to carry a shaft 5 projecting through to the inside of the framework where it carries a flanged roller 6, the flange 7 being nearest the upright 2. This roller is one of several on which a shelf 8 can run horizontally, normal to the plane of the figure, being laterally confined by the flanges 7.

So far, this is a known arrangement for carrying a moving shelf.

Within the upright 2 the shaft 5 has a sprocket 9 keyed to it, and this is traversed by a chain 10 which goes around another sprocket 11 on a shaft 12 carried by bearings 13 and 14 directly above. The shaft 12 has a squared end 15 accessible through an aperture 16 to a socket 17 at the end of a crank handle 18. It will be seen that the rollers 6 can be rotated by turning that handle.

A further sprocket 19 is shown keyed to the shaft 5 traversed by another chain 20, which can drive another roller similar to the roller 6 and also supporting the shelf 8.

There is a similar mirror-image arrangement at the other side of the shelf 8.

The coupling is by a layshaft 21 with the stem 22 or stub shaft of a mushroom shaped member 23 screw-threaded into each end. The screw threading also carries a lock nut 24, but it does not extend the length of the shaft 22. The portion nearest the head 25 is plain cylindrical. This head 25 has three apertures equi-spaced around its axis which can register with drilled and tapped bores in the inner face of the associated roller 6, which will receive bolts 26.

Figure 3:
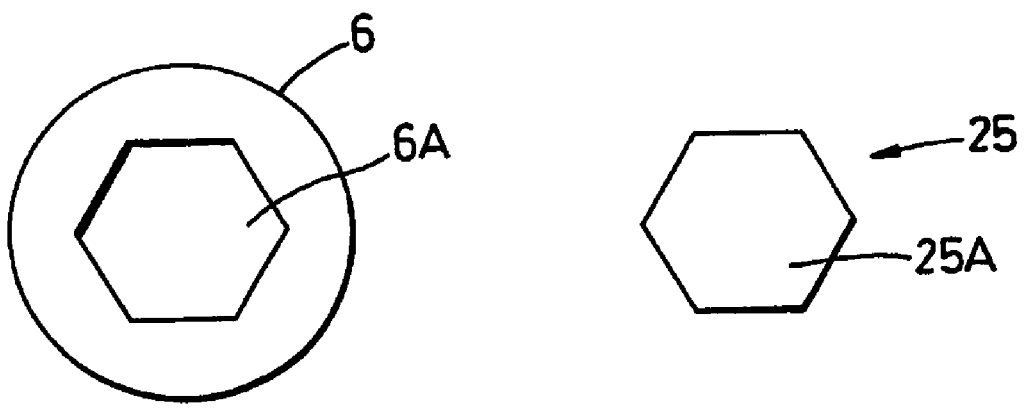
FIG. 3 is an end view of a roller and a head of a stub shaft used in an alternative embodiment of the storage structure laid side by side, and FIG. 4 details a locking mechanism used in an alternative embodiment.

In an alternative embodiment shown diagramatically in FIG. 3, the head 25 has a polygonal projection 25A and can key into a complementary socket 6A in the inner face of the roller 6. In another embodiment, the face of the roller 6 includes the projection, which can engage with a corresponding socket formed in the end of the head 25.

The additional support is provided at each side by an inverted T-shaped bracket 27, its stem containing a bearing 28 which embraces the plain portion of the shaft 22. But as mentioned previously, it could be a jack to enable adjustments to be made. A simple screw device would suffice.

The assembly is carried out by releasing the lock nuts 24 and screwing each coupling member 23 into the layshaft so that the assembly can fit easily between the opposed rollers 6. Each support bracket 27 hangs from the associated shaft 22 between the lock nut 24 and the head 25.

The coupling members 23 are then screwed out again until their heads 25 engage the respective rollers 6 and their apertures register with the bores in those rollers. The bolts 26 are then introduced and tightened down. The lock nuts 24 are rotated until they tighten against the ends of the layshaft 21.

Each bracket 27 is then shifted as necessary lengthwise of the shaft 22 until its base with preformed holes registers with drillings in the base 1 so that it can be secured by bolts 29.

Figure 4:
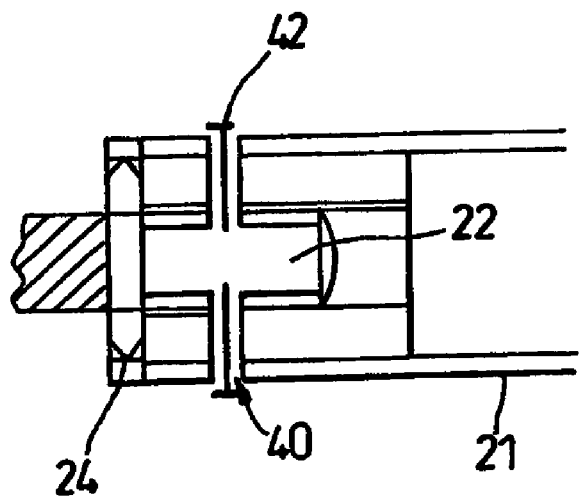

In case the lock nuts 24 are not considered sufficient, the embodiment detailed in FIG. 4 may be used. A transverse drilling 40 is made through each end of the layshaft and through the threaded portions of the stems 22, and then pins 52 can be inserted through the drilling.

I claim:

1. A support system for a moving shelf, the system comprising:
    a) opposed flanged rollers (6), co-axial and with their flanges (7) outermost to support and guide a shelf (8) between the flanges;
    b) coupling members (23) to co-operate with inner faces of the flanged rollers to present co-axial inwardly projecting stub shafts (22), the coupling members being adapted to co-operate with the rollers in a manner to ensure co-rotation;
    c) a support (27) for each said coupling member whose stub shaft is embraced by a bearing (28) carried by the support, the supports being mounted on an underlying base (1) rotationally to carry the coupling members so that in use load on the rollers is transferred via said co-operation to the supports;
- d) a layshaft (21), each of whose ends is telescopically engageable with the free ends of the stub shafts, and
- e) one or more components (26) for preventing relative rotation between the stub shafts and the layshaft and between the coupling members and the rollers, wherein the assembly of coupling members, supports and layshaft is axially expandable by the telescopic engagement to provide said co-operation and the assembly is axially reducible by the telescopic engagement to release said co-operation.

2. A support system according to claim 1, wherein each said coupling member (23) is generally disc-shaped with a substantially central perpendicular stem, the stem forming the stub shaft (22).

3. A support system according to claim 2, wherein the disc (25) of the coupling member (23) is connected to the associated roller (6) by means of a bolt (26).

4. A support system according to claim 2, wherein the disc (25) of the coupling member (23) has polygonal protrusion (25A) and keys into a complementary socket (6A) in an inner face of the roller (6).

5. A support system according to claim 1, wherein the stub shaft (22) is screw-threaded over its free end portion beyond the portion within the bearing (28) and is screwed into the end of the layshaft (21).

6. A support system according to claim 5, further including a lock nut (24) for tightening against an end of the layshaft (21).

7. A support system according to claim 5 further including a lock nut (24) for tightening against an end of the layshaft (21) and further including a transverse drilling (40) through the overlap of stub shaft (22) and layshaft (21) to receive a pin (42).

8. A support system according to claim 1, wherein the stub shaft (22) has a non-rotational but axially movable relationship to the layshaft (21) and a locking device (26) operable to fix the stub shaft relative to the layshaft.

9. A support system according to claim 1, wherein the supports (27) include plain brackets with bearings (28).

10. A support system according to claim 1, wherein the supports (27) are vertically adjustable.

11. A support system according to claim 10, wherein the supports (27) are vertically adjustable by means of a jack.

12. A method of assembling a support system for a moving shelf, the system comprising:
- a) opposed flanged rollers (6), co-axial and with their flanges (7) outermost to support and guide a shelf (8) between the flanges,
- b) coupling members (23) to co-operate with inner faces of the flanged rollers to present co-axial inwardly projecting stub shafts (22), the coupling members being adapted to co-operate with the rollers in a manner to ensure co-rotation;
- c) a support (27) for each said coupling member whose stub shaft is embraced by a bearing (28) carried by the support, the supports being mounted on an underlying base (1) rotationally to carry the coupling members so that in use load on the rollers is transferred via said co-operation to the supports; and
- d) a layshaft (21), each of whose ends is telescopically engageable with the free ends of the stub shafts, the method including steps of:
  1) axially reducing the assembly of coupling members, supports and layshaft by adjustment of the telescopic engagement to locate between the opposed rollers,
  2) axially expanding the assembly for the coupling members to co-operate with the rollers in a manner to ensure co-rotation, and
  3) applying means to prevent relative rotation between the stub shaft and the layshaft, if the relative rotation is not already prevented by virtue of the shapes of those shafts.

13. A support system for a moving shelf, the system comprising:
- a) opposed flanged rollers (6), co-axial and with their flanges (7) outermost to support and guide a shelf (8) between the flanges,
- b) coupling members (23) to co-operate with inner faces of the flanged rollers to present co-axial inwardly projecting stub shafts (22),
- c) a support (27) for each said coupling member whose stub shaft is embraced by a bearing (28) carried by the support,
- d) a layshaft (21), each of whose ends is telescopically engageable with the free ends of the stub shafts, and
- e) means (26) for preventing relative rotation between the stub shafts and the layshaft and between the coupling members and the rollers, wherein
  1) the assembly of coupling members, supports and layshaft is reduced axially, by the telescopic engagement, to locate between the opposed rollers,
  2) the assembly is expanded axially for the coupling members to co-operate with the rollers in a manner to ensure co-rotation,
  3) the supports are mounted on an underlying base (1), rotationally to carry the coupling members so that load on the rollers is transferred via said co-operation to the supports, and
  4) the means for preventing relative rotation between the stub shaft and the layshaft is put in place, if not already there by virtue of the shapes of those shafts.

* * * * *